(12) United States Patent (10) Patent No.: US 8,638,065 B2
Sakakibara (45) Date of Patent: Jan. 28, 2014

(54) BATTERY PACK AND BATTERY PACK SYSTEM

(76) Inventor: Kazuyuki Sakakibara, Okazaki (JP)

( * ) Notice: Subject to any disclaimer, the term of this patent is extended or adjusted under 35 U.S.C. 154(b) by 274 days.

(21) Appl. No.: 13/084,227

(22) Filed: Apr. 11, 2011

(65) Prior Publication Data

US 2011/0254508 A1 Oct. 20, 2011

(30) Foreign Application Priority Data

Apr. 14, 2010 (JP) ................................. 2010-092789

(51) Int. Cl.
*H02J 7/00* (2006.01)
(52) U.S. Cl.
USPC .............. 320/118; 320/124; 320/127; 307/66
(58) Field of Classification Search
CPC ...................................................... H02J 7/0016
USPC .......................................................... 320/118
See application file for complete search history.

(56) References Cited

U.S. PATENT DOCUMENTS

| | | | |
|---|---|---|---|
| 5,721,481 A | 2/1998 | Narita et al. | |
| 6,255,826 B1 | 7/2001 | Ohsawa et al. | |
| 6,486,635 B1 | 11/2002 | Matsuda et al. | |
| 7,511,451 B2 | 3/2009 | Pierce | |
| 7,567,116 B2 | 7/2009 | Yoshio | |
| 7,638,979 B2 | 12/2009 | Vandensande | |
| 7,859,223 B2 * | 12/2010 | Gorbold .................. | 320/119 |
| 8,222,863 B2 | 7/2012 | Sakakibara et al. | |
| 2004/0066172 A1 | 4/2004 | Takano et al. | |
| 2005/0194931 A1 | 9/2005 | Sobue et al. | |
| 2006/0012337 A1 | 1/2006 | Hidaka et al. | |
| 2006/0012342 A1 * | 1/2006 | Kamenoff ................ | 320/153 |
| 2006/0103350 A1 * | 5/2006 | Lai .......................... | 320/118 |
| 2007/0024237 A1 | 2/2007 | Cole, Jr. et al. | |
| 2007/0108942 A1 | 5/2007 | Johnson et al. | |

(Continued)

FOREIGN PATENT DOCUMENTS

JP 02-162662 A 6/1990
JP 09-154236 A 6/1997

(Continued)

OTHER PUBLICATIONS

"International Application Serial No. PCT/JP2008/066334, International Search Report mailed Oct. 28, 2008", 2 pgs.

(Continued)

*Primary Examiner* — Drew A Dunn
*Assistant Examiner* — Nathaniel Pelton
(74) *Attorney, Agent, or Firm* — Schwegman Lundberg & Woessner, P.A.

(57) ABSTRACT

A battery pack usable as a power source of an electric device, is disclosed, in which battery modules are in series; each battery module is configured to include battery cells in series; a discharge controller controls discharge power which is supplied from the battery modules to the electric device; a modulator modulates a voltage of each module between a high voltage and a low voltage which is higher than zero and lower than the high voltage; the high voltage and the low voltage are set to allow a load device of the electric device to operate by the high voltage, and to allow the load device not to operate by the low voltage; and the discharge controller operates by the battery modules, irrespective of whether each module outputs the high voltage or the low voltage.

3 Claims, 8 Drawing Sheets

(56) References Cited

U.S. PATENT DOCUMENTS

| | | |
|---|---|---|
| 2007/0188130 A1 | 8/2007 | Scheucher |
| 2008/0224661 A1 | 9/2008 | Onose |
| 2008/0224667 A1 | 9/2008 | Tanaka et al. |
| 2008/0238370 A1 | 10/2008 | Carrier et al. |
| 2009/0102421 A1 | 4/2009 | Imai |
| 2009/0108806 A1 | 4/2009 | Takano et al. |
| 2009/0146824 A1* | 6/2009 | Diraison et al. ........... 340/636.1 |
| 2009/0208821 A1 | 8/2009 | Kosugi et al. |
| 2009/0212738 A1 | 8/2009 | Coonan et al. |
| 2009/0224725 A1 | 9/2009 | Tatebayashi et al. |
| 2009/0251100 A1* | 10/2009 | Incledon et al. ............. 320/106 |
| 2010/0181966 A1 | 7/2010 | Sakakibara |
| 2010/0244769 A1 | 9/2010 | Sakakibara |
| 2011/0012560 A1 | 1/2011 | Sakakibara |

FOREIGN PATENT DOCUMENTS

| | | |
|---|---|---|
| JP | 2000-312443 A | 11/2000 |
| JP | 2001-023589 A | 1/2001 |
| JP | 2001-116776 A | 4/2001 |
| JP | 2001-231178 A | 8/2001 |
| JP | 2001-333547 A | 11/2001 |
| JP | 2002-010517 A | 1/2002 |
| JP | 2002-254355 A | 9/2002 |
| JP | 2004-048964 A | 2/2004 |
| JP | 2004064977 A | 2/2004 |
| JP | 2004-112954 A | 4/2004 |
| JP | 2004-147022 A | 5/2004 |
| JP | 2005-117780 A | 4/2005 |
| JP | 2006-067782 A | 3/2006 |
| JP | 2006-109540 A | 4/2006 |
| JP | 2007-110820 A | 4/2007 |
| JP | 2007-229827 A | 9/2007 |
| JP | 4-104648 B1 | 6/2008 |
| JP | 4104648 B1 | 6/2008 |
| JP | 4216898 B1 | 1/2009 |
| JP | 2009-071976 A | 4/2009 |
| WO | WO-2009/118963 A1 | 10/2009 |
| WO | WO-2010/047255 A1 | 4/2010 |

OTHER PUBLICATIONS

"International Application Serial No. PCT/JP2008/066334, Written Opinion mailed Oct. 28, 2008", (w/ English Translation), 11 pgs.

"International Application Serial No. PCT/JP2008/072736, International Search Report mailed Feb. 10, 2009", 1 pg.

"Machine Language Translation of JP-4216898A", 63 pgs.

"European Application Serial No. 11162064.7, European Search Report mailed Jul. 7, 2011", 6 pgs.

"U.S. Appl. No. 12/722,210, Non Final Office Action mailed Mar. 30, 2012", 12 pgs.

"U.S. Appl. No. 12/722,210, Non Final Office Action mailed Apr. 11, 2013", 9 pgs.

"U.S. Appl. No. 12/722,210, Notice of Allowance mailed Nov. 14, 2012", 12 pgs.

"U.S. Appl. No. 12/722,210, Response filed Jul. 2, 2012 to Non Final Office Action mailed", 14 pgs.

"U.S. Appl. No. 12/816,227, Notice of Allowance mailed May 15, 2012", 9 pgs.

"U.S. Appl. No. 12/888,877, Non Final Office Action mailed May 1, 2013", 11 pgs.

"Machine Language Translation of JP-4104648", 39 pgs.

* cited by examiner

BATTERY PACK AND BATTERY PACK SYSTEM

CROSS-REFERENCE TO RELATED APPLICATIONS

This application claims the priority benefit of Japanese Patent Application No. 2010-092789, filed Apr. 14, 2010, the content of which is incorporated herein by reference in its entirety.

BACKGROUND OF THE INVENTION

1. Field of the Invention

The present invention relates to a battery pack usable as a power source of an electric device, and a battery pack system configured to include therein the battery pack and the electric device, and more particularly to such a battery pack and such a battery pack system each of which includes therein a battery cell group of a plurality of serially-interconnected battery cells or a serial array of battery cells, wherein each battery cell is in the form of a rechargeable battery such as a Li-ion battery.

2. Description of the Related Art

An electric device is primarily powered by an AC voltage supplied from a commercial power source, or a DC voltage supplied from battery cells. As one of performance characteristics required for an electric device, a high output is focused on. To drive the high-output electric device with energy stored in a battery pack, the battery pack is required to output a high voltage. An example of such a conventional battery pack or such a battery pack system is disclosed in Japanese Patent Nos. 4104648 and 4216898.

BRIEF SUMMARY OF THE INVENTION

For a conventional technology, a battery pack system combined with a 108V Li-ion battery pack will be described below.

Conventionally, the 108V Li-ion battery pack for use in the battery pack system is constructed with thirty (30) Li-ion battery cells interconnected in series, each of which has 3.6 volts. This allows such a voltage to be supplied with an electric device, that is significantly higher than that of, for example, a 18V Li-ion battery pack constructed with five (5) Li-ion battery cells interconnected in series or in a serial array. Therefore, the electric device can output high power efficiently.

The conventional battery pack, however, has a drawback that a high voltage of 108 volts at a maximum can frequently apply to inner segments within the battery pack, such as locations between the battery cells having mutually different voltages, locations between voltage monitor wires, space between the voltage monitor wires and the battery cells, and locations between discharging terminals having opposite polarities. To eliminate the drawback, the present inventor has proposed the following approach:

As illustrated in FIG. 8, according to the approach proposed by the inventor, a battery pack 200 is constructed to include: a battery module group of three (3) battery modules 100 interconnected in series, which generate a total voltage of 108 volts; and a discharge output terminal 201 for supplying a total voltage of 108 volts to an electric device 300, with these components housed within a casing, wherein each battery module 100 generating 36 volts is a serial array of ten (10) Li-ion battery cells generating 36 volts. The electric device 300 houses a load controller 305 which acts as a discharge controller controls the state (i.e., active and/or inactive) of a load device 304 within the electric device 300, based on a detection result of at least one of a voltage, a temperature and a current, of at least one of the battery cells within the battery pack 200.

Notably, in the above-described arrangement, if there is the need for stopping the electric device 300, then the load controller 305 shifts the state of each battery module 100 from an output state (i.e., an active state) to a stop state (i.e., an inactive state). As a result, the battery cells within the battery pack 200 are electrically isolated or disconnected from each other. Therefore, the number of battery cells which are serially interconnected, has reduced to ten (10), which is smaller than the total number (thirty (30)) of the battery cells belonging to the battery cell group or the battery pack 200. As a result, a total voltage of battery cells which are interconnected in series is lowered (to 36 volts at a maximum), which prevents a high voltage (108 volts) from being impressed onto inner segments within the battery pack 200. No impression of such a high voltage prevents the electric breakdown within the battery pack 200, and the electrical leakage to outside the battery pack 200 due to introduction of foreign matters into the battery pack 200, with improved the electrical-insulation reliability of the battery pack 200.

The load controller 305 must be prepared for upcoming possible restart of power supply to the electric device 300, during the above-described stop state in which the battery cells within the battery pack 200 are electrically isolated or disconnected from each other.

The present inventor has newly proposed that, in order to keep the load controller 305 active even in the absence of power supplied from the battery cell group due to electrical isolation between the battery cells of the serially-interconnected battery cell group, as illustrated in FIG. 8, a backup power supply 309 with an electricity storage device (although not illustrated, in the form of, for example, a small-scale rechargeable battery) is disposed within the electric device 300, to thereby allow the load controller 305 to keep working by electricity supplied from the electricity storage.

The backup power supply 309 operates, such that, in an active state of the electric device 300, that is, a state in which the battery cells within the battery pack 200 are electrically connected to each other for electric conduction, the backup power supply 309 receives electricity from the battery cell group, and, using the received electricity, the backup power supply 309 charges the electricity storage device. On the other hand, the backup power supply 309 operates, such that, in an inactive state of the electric device 300, that is, a state in which the battery cells within the battery pack 200 are electrically disconnected from each other for electric isolation, the backup power supply 309 allows the electricity storage device to discharge electric energy that has been stored in the electricity storage device. In the inactive state of the electric device 300, the electric energy discharged from the electricity storage device is consumed by the load controller 305 to detect the state of the battery cells within the battery pack 200 and, on demand in the future, to bring the battery cells of the battery cell group into a conduction state in which the battery cells are electrically connected to each other for electric conduction.

Due to this, if the electric device 300 is kept in the inactive state for a long term, then the electricity storage device of the backup power supply 309 has lost its remaining charge, which gives rise to the possibility the load controller 305 cannot be activated again, that is, the possibility that the electric device 300 cannot be used again. If a countermeasure is taken to eliminate the above possibility, that the maximum capacity of the electricity storage device is increased, a cost increase problem cannot be avoided. If, alternatively, another countermeasure is taken for the same goal, that, in the inactive state of the electric device 300, power is supplied from at least designated one of the battery cells within the battery pack 200 directly to the load controller 305, without passing through switching devices between the battery cells of the battery cell group, then the designated battery cell has a reduced residual amount of charge relative to that of each of the rest of the battery cells within the battery pack 200, resulting in capacity (or charge) imbalance among the battery cells. The capacity imbalance can easily cause a reduction in the life time of the battery cells, a reduction in the run time of the electric device, and so on. Notably, the longer the electric device 300 is kept inactive, the larger the capacity imbalance. Although various control techniques for eliminating the capacity imbalance are well known, even if any one of these techniques is employed, a cost increase problem cannot be avoided.

Under the circumstances described above, the invention has been created to provide a battery pack including a discharge controller, or a battery pack system including an electric device, a battery pack usable as a power source of the electric device, and a discharge controller controlling the discharge function of the battery pack, which prevents high voltages from being frequently impressed onto inner segments of the battery pack, and which allows the discharge controller to successfully restart even after the battery pack has kept stopping power supply to the discharge controller for a long term, while limiting a cost increase.

GENERAL OVERVIEW OF THE INVENTION

The object mentioned above may be achieved according to any one of the following modes of this invention. These modes will be stated below such that these modes are sectioned and numbered, and such that these modes depend upon the other mode or modes, where appropriate. This is for a better understanding of some of a plurality of technological features and a plurality of combinations thereof disclosed in this description, and does not mean that the scope of these features and combinations is interpreted to be limited to the scope of the following modes of this invention. That is to say, it should be interpreted that it is allowable to select the technological features which are stated in this description but which are not stated in the following modes, as the technological features of this invention.

Furthermore, stating each one of the selected modes of the invention in such a dependent form as to depend from the other mode or modes does not exclude a possibility of the technological features in a dependent-form mode to become independent of those in the corresponding depended mode or modes and to be removed therefrom. It should be interpreted that the technological features in a dependent-form mode is allowed to become independent according to the nature of the corresponding technological features where appropriate:

(1) A battery pack usable as a power source of an electric device, comprising:

a battery module group in which a plurality of battery modules are interconnected in series; and a discharge output terminal through which discharge power is supplied from the battery module group to the electric device, wherein each battery module is configured to include a battery cell group in which a plurality of battery cells are interconnected in series, the battery pack further comprising:

a discharge controller configured to control the discharge power which is supplied from the battery module group to the electric device; and an output voltage modulator configured to modulate a module output voltage of each battery module between a high voltage and a low voltage which is higher than zero and lower than the high voltage, depending on an instruction signal from the discharge controller, wherein the electric device is configured to include a load device, the load device operates by the discharge power of the battery module group when each battery module outputs the high voltage, and does not operate by the discharge power of the battery module group when each battery module outputs the low voltage, and the discharge controller operates by the battery module group, irrespective of whether each battery module outputs the high voltage or the low voltage.

In this mode, the "output voltage modulator" may be implemented in an exemplary arrangement in which the modulator modulates the output voltage of the battery module to not only the high voltage and the low voltage, but also an additional voltage whose level is different from those of the high voltage and the low voltage. In addition, the "discharge controller" may be disposed within the battery pack, within the electric device, or so as to span both of them. This is applicable to the "output voltage modulator."

Furthermore, an example of the "discharge controller" is constructed to include at least the function of shifting the battery pack, between a conduction state in which the discharge output terminal of the battery pack is electrically connected with the electric device for electric conduction, and an isolation state in which the discharge output terminal is electrically disconnected from the electrical device. Still further, the "discharge controller" is constructed such that, the output power of the battery module group (i.e., the output power of the battery pack), after conversion, is supplied to the discharge controller, and the discharge controller is activated by the supplied power.

(2) The battery pack according to mode (1), wherein the output voltage modulator is configured to include:

a switching device which is connected with a current path allowing a current to flow to the battery module group and the discharge output terminal, and which varies between an ON state and an OFF state, in response to a control signal; and switching-control circuitry configured to perform switching control for the switching device, by supplying the control signal with a variable duty ratio, to the switching device, and to control the control signal such that the duty ratio varies between when the module output voltage is equal to the high voltage and when the module output voltage is equal to the low voltage.

(3) The battery pack according to mode (1), wherein the output voltage modulator is configured to include:

a switching device which is connected with a current path allowing a current to flow to the battery module group and the discharge output terminal, and which varies between an ON state and an OFF state, in response to a control signal; and a voltage divider connected to the battery cell group in parallel, per each battery module, and configured to selectively divide a total voltage of the battery cells that belong to the battery cell group, to produce a fractional voltage of the total voltage, such that, when the switching device is in the ON state, the module output voltage is equal to the total voltage, and when the switching device is in the OFF state, the module output voltage is equal to the fractional voltage.

(4) The battery pack according to any one of modes (1) to (3), wherein the output voltage modulator is configured to modulate the module output voltage substantially continuously or in steps, as time elapses, during a period in which the module output voltage transitions between the high voltage and the low voltage.

(5) A battery pack system having an electric device and a battery pack usable as a power source of the electric device, comprising:

a battery module group in which a plurality of battery modules are interconnected in series; and a discharge output terminal through which discharge power which is supplied from the battery module group to the electric device, wherein each battery module is configured to include a battery cell group in which a plurality of battery cells are interconnected in series, the battery pack system further comprising:

a discharge controller configured to control the discharge power is supplied from the battery module group to the electric device; and an output voltage modulator configured to modulate a module output voltage of each battery module between a high voltage and a low voltage which is higher than zero and lower than the high voltage, depending on an instruction signal from the discharge controller, wherein the high voltage and the low voltage are set to allow a load device of the electric device to operate by the discharge power of the battery module group when each battery module outputs the high voltage, and to allow the load device not to operate by the discharge power of the battery module group when each battery module outputs the low voltage, and the discharge controller operates by the battery module group, irrespective of whether each battery module outputs the high voltage or the low voltage.

(6) The battery pack system according to mode (5), wherein the output voltage modulator is configured to include:

a switching device which is connected with a current path allowing a current to flow to the battery module group and the discharge output terminal, and which varies between an ON state and an OFF state, in response to a control signal; and switching-control circuitry configured to perform switching control for the switching device, by supplying the control signal with a variable duty ratio, to the switching device, and to control the control signal such that the duty ratio varies between when the module output voltage is equal to the high voltage and when the module output voltage is equal to the low voltage.

(7) The battery pack system according to mode (5), wherein the output voltage modulator is configured to include:

a switching device which is connected with a current path allowing a current to flow to the battery module group and the discharge output terminal, and which varies between an ON state and an OFF state, in response to a control signal; and a voltage divider connected to the battery cell group in parallel, per each battery module, and configured to selectively divide a total voltage of the battery cells that belong to the battery cell group, to produce a fractional voltage of the total voltage, such that, when the switching device is in the ON state, the module output voltage is equal to the total voltage, and when the switching device is in the OFF state, the module output voltage is equal to the fractional voltage.

(8) The battery pack system according to any one of modes (5) to (7), wherein the output voltage modulator is configured to modulate the module output voltage substantially continuously or in steps, as time elapses, during a period in which the module output voltage transitions between the high voltage and the low voltage.

The above-described battery pack or battery pack system would allow, when the discharge controller within the battery pack system or the battery pack stops supply of electricity from the battery pack to the load device of the electric device, an actual output voltage of the battery cell group, in which the battery cells are interconnected in series for electric conduction, to have a lower voltage than that of the battery cell group when the electricity is supplied from the battery pack to the load device of the electric device. Therefore, the above-described battery pack or battery pack system would reduce how often a high voltage is impressed onto inner segments within the battery pack system or the battery pack, and prevents electric breakdown within the battery pack and electrical leakage to outside of the battery pack due to introduction of foreign matters from outside of the battery pack, resulting in improved electric-isolation reliability of the battery pack system or the battery pack.

Further, the above-described battery pack or battery pack system would allow voltage modulation or transformation to be performed not directly for the total output voltage of the battery module group, but separately for the individual output voltages of the battery modules which together constitute the battery module group. Therefore, the above-described battery pack or battery pack system would reduce how often a high voltage is impressed onto inner segments within the battery pack system or the battery pack, so as to be fewer than when the voltage modulation is performed directly for the total output voltage of the battery module group.

Still further, the above-described battery pack or battery pack system would allow the discharge controller to be prepared for upcoming possible restart of power supply to the electric device, during a stop state of the discharge controller within the battery pack system or the battery pack to supply power to the electric device, owing to direct utilization of the voltage of the battery cell group, which is enabled by keeping the battery cells within the battery pack in an electric conduction state in which the battery cells are not electrically isolated or disconnected from each other. That is, the above-described battery pack or battery pack system would ensure restart of the discharge controller, without requiring adding a backup power supply having an electricity storage device to the battery pack system or the battery pack, with the effects of design simplification and cost reduction.

It is evident from the foregoing explanation that the above-described battery pack or battery pack system would minimize how often a high voltage is impressed onto segments within the battery pack, resulting in improved electrical-insulation reliability of the battery pack, and would improve reliability of system restart after the battery pack has kept stopping power output for long time and/or the electric device has been kept inactive for long time, while reducing the required cost.

It is noted here that, as used in this specification, the singular form "a," "an," and "the" include plural reference unless the context clearly dictates otherwise. It is also noted that the terms "comprising," "including," and "having" can be used interchangeably.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Several presently preferred embodiments of the invention will be described in more detail by reference to the drawings in which like numerals are used to indicate like elements throughout.

There will be next described in more detail with reference to the drawings, battery pack systems according to some of more specific illustrative embodiments of the present invention.

Figure 1:
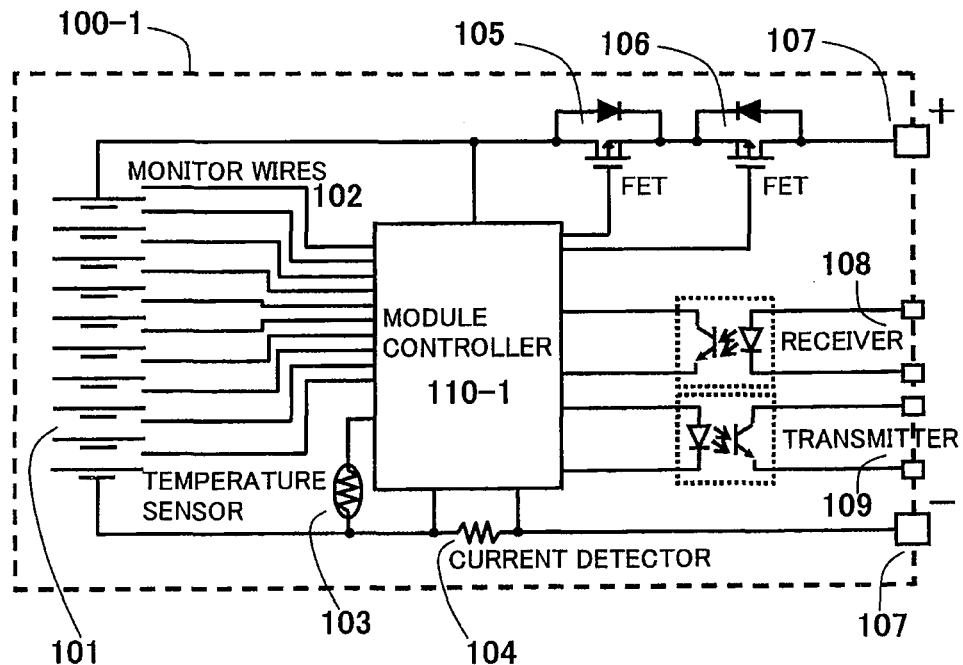
FIG. 1 is a functional block diagram illustrating a representative one of a plurality of battery modules interconnected in series, in a battery pack system according to a first illustrative embodiment of the present invention.

FIG. 1 is a functional block diagram illustrating a representative one of a plurality of battery modules 100-1 interconnected in series (or in a serial array), in a battery pack system according to a first illustrative embodiment of the present invention. The battery pack system includes an electric device (e.g., a power tool) and a battery pack usable as a power source of the electric device.

As illustrated in FIG. 1, the battery module 100-1 includes ten (10) Li-ion battery cells 101 each of which has a nominal voltage of 3.6 volts and which are interconnected in series, and the serial array of the ten (10) battery cells 101 (hereinafter, referred to as a "battery cell group") is electrically connected with a terminal (including a plurality of terminal ends) 107 through an FET (Field-Effect Transistor) 105 for charge and an FET 106 for discharge. It is added that a specific type of the battery cells 101 is, not limited to, Li-ion batteries, but may cover a wide range of types of rechargeable batteries which can generate electric power within the battery pack 200-1.

A module controller 110-1 is electrically connected with a voltage detector 102 for detecting a voltage of each battery cell 101, a temperature detector 103 for detecting the temperature of the battery cells 101, and a current detector 104 for detecting a current flowing through the battery cell group, and performs predetermined control (elaborated below by reference to FIG. 3) using the FETs 105 and 106, based on signals received from the detectors 102, 103 and 104.

Figure 2:
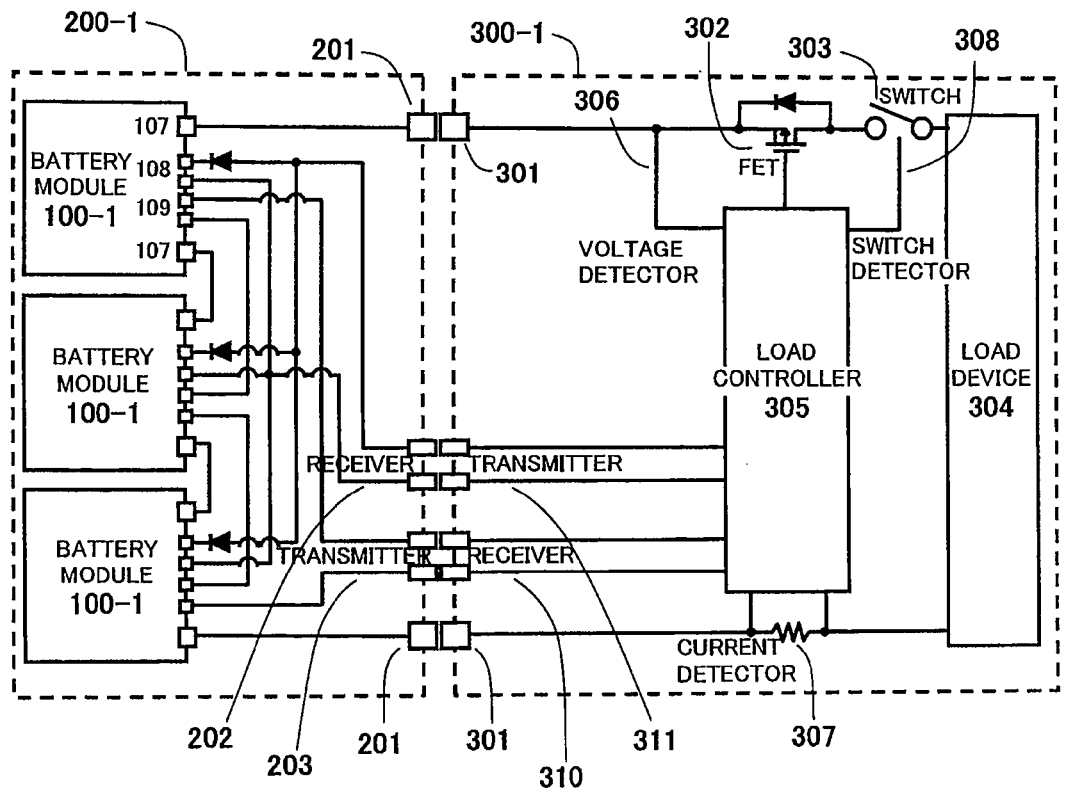
FIG. 2 is a functional block diagram illustrating the battery pack system including the battery modules depicted in FIG. 1.

The module controller 110-1 includes a receiver 108 and a transmitter 109, and, through the receiver 108 and the transmitter 109, the module controller 110-1 receives a signal from and transmits a signal to a load controller 305 disposed in an electric device 300-1 depicted in FIG. 2. The battery pack 200-1 is constructed by serially interconnecting the three (3) battery modules 100-1, and therefore, the receivers 108 and the transmitters 109 of the battery modules 100-1 have respective levels of ground potential which are different between the battery modules 100-1. For this reason, whether it is one of the receivers 108 or one of the transmitters 109, it may be preferably in the form of a device such as a photo-coupler (see FIG. 1), which can transmit/receive an electrical signal while ensuring electrical isolation.

It is added that, for a type of signal communication between the receiver 108 and the transmitter 109, it does not matter whether the signal communication is of a wired type or a wireless type, as long as the signal communication can allow the discharge control at the module controller 110-1 and the discharge control at the load controller 305, to be performed in association or synchronization with each other, and in addition, it does not matter whether a type of a signal used for the signal communication is analog or digital. Moreover, as illustrated in FIG. 1, the terminals used for the signal communication are exclusive, but alternatively, the terminals may be intended also for one or more additional purposes.

The module controller 110-1 is configured to modulate a battery module voltage outputted from the terminal 107, such that the battery module voltage is a selected one of a plurality of voltages including a first voltage V1 and a second voltage V2 which is higher than zero and lower than V1 (0<V2<V1), based on a detection result from at least one of the voltage detector 102, the temperature detector 103 and the current detector 104, and/or, based on the signal which the receiver 108 receives from the load controller 305. In the present embodiment, the first voltage V1 is one example of the above-described high voltage, while the second voltage V2 is one example of the above-described low voltage.

In an exemplary implementation, if at least one of the voltage of at least one of battery cells of a battery cell group, the temperature of at least one of battery cells of a battery cell group, and the current flowing through the battery cell group, falls outside an allowable range that permits the electric device 300-1 to run, or, if the module controller 110-1 has received from the receiver 108 a signal indicating that a load device 304 of the electric device 300-1 is not permitted to run, then the battery module voltage is made equal to V2, and if not so, the battery module voltage is made equal to V1. In the present embodiment, it can be considered that the load controller 305 constitutes one example of the above-described "discharge controller," and that the module controller 110-1 constitutes another example of the "discharge controller."

In addition, when modulating the battery module voltage from V1 to V2, the module controller 110-1 transmits from the transmitter 109 to the load controller 305 a signal indicating that the battery module voltage V1 is permitted to occur. On the other hand, when the battery module voltage V1 is permitted to occur, the module controller 110-1 transmits from the transmitter 109 to the load controller 305, a signal indicating that V1 is permitted to occur.

The battery module voltage V1 is a voltage required to activate the load controller 305 and the load device 304 of the electric device 300-1, and is approximately equal to the total voltage of the battery cell group within the battery module 110-1. In addition, the battery module voltage V2 is lower than V1, and may be low enough to keep the load device 304 of the electric device 300-1 inactive, or equal to a minimum voltage over which the battery module 100-1 can activate the load controller 305, but at which the battery module 100-1 cannot substantially cause the load device 304 to function.

Figure 4:
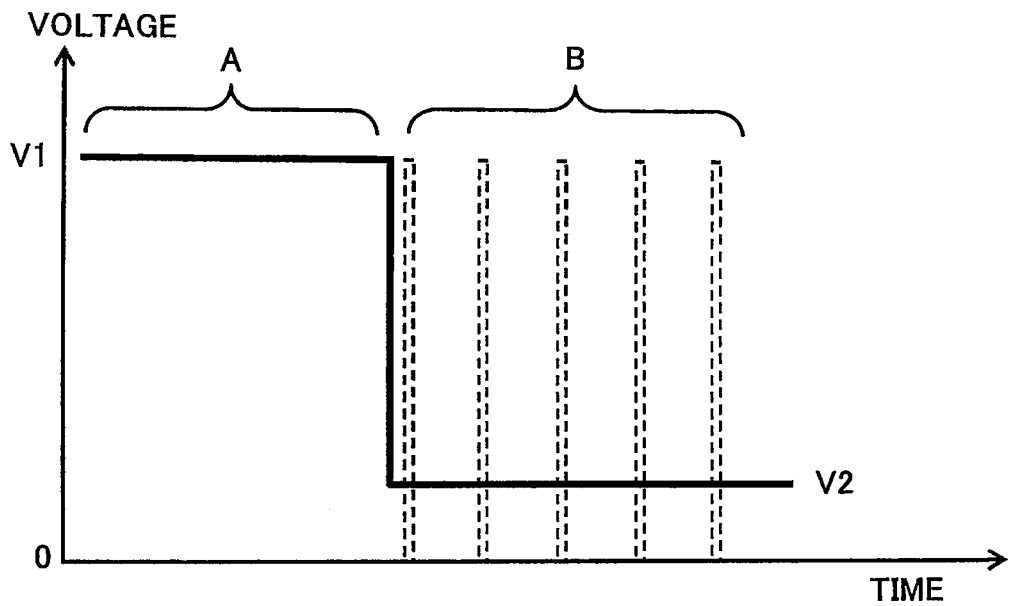
FIG. 4($a$) is a graph illustrating an example of the temporal change of an output voltage of the battery module in the battery pack system depicted in FIG. 2, and FIG. 4($b$) is a graph illustrating another example of the temporal change of the output voltage.
Figure 4:
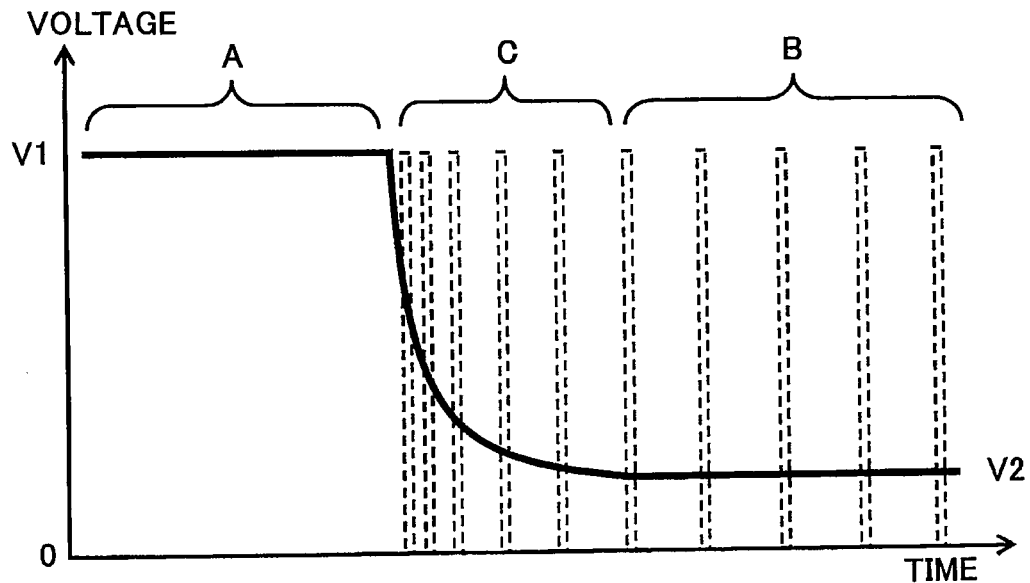

In an example, as illustrated in FIG. 4(a), it may be preferable that the battery module voltage V1 is produced by turning on the FET 106, so that V1 can be approximately 36 volts which is equal to the total voltage of the battery cell group of a serial array of battery cells, while the battery module voltage V2 is produced by performing switching control (i.e., on-off control or duty cycle control) for the FET 106, so that V2 can be approximately 5 volts.

In this example, during an output period A in which the battery module voltage V1 is generated, a control signal is inputted to the gate of the FET 106, which has a duty ratio or cycle of, for example, 100%, and, on the other hand, during an output period B in which the battery module voltage V2 is generated, the control signal has a duty ratio which is lower than that for V1, and which is, for example, approximately 10-30%. In this example, the FET 106 (i.e., one example of a switching device connected with a current path) constitutes an example of the above-described "output voltage modulator."

In an alternative, both the battery module voltages V1 and V2 are generated by on-off control or duty cycle control for the FET 106 with respective duty ratios both lower than 100%, so that V1 and V2 can be two different voltages which are optimum for the electric device 300-1.

How to modulate the battery module voltage between V1 and V2, any one of a variety of different manners may be selected, which include (a) changing the battery module voltage between V1 and V2 instantaneously, as illustrated in FIG. 4(a), (b) changing the battery module voltage in steps, among V1, V2 and at least one intermediate voltage, (c) changing the battery module voltage between V1 and V2 substantially gradually and continuously, as illustrated in FIG. 4(b) (e.g., changing the above-described duty ratio substantially continuously), and the like. Notably, gradually changing the battery module voltage from V1 to V2 and/or from V2 to V1 would provide an additional effect of suppressing surge voltage caused by the reactance of the relevant circuit, to thereby reduce burden on components in the circuit. In the example illustrated in FIG. 4(b), "A" denotes an output period in which the battery module voltage V1 is generated, "B" denotes an output period in which the battery module voltage V2 is generated, and "C" denotes a transition period in which the battery module voltage transitions.

In an example, the module controller 110-1 may be configured to turn off the FET 106, in a case in which, while the battery module voltage V2 is being generated, the voltage of at least one of the battery cells 101, which has been detected by the voltage detector 102, has reduced to a voltage lower than a predetermined value, or in a case in which a predetermined time having a length, for example, equal to or longer than the length of one day, has passed after the output of the battery module voltage V2 began, to thereby prevent overcharge of the battery cells 101.

It is added that, in the present embodiment, the FET 106 is controlled by the module controller 110-1, but in an alternative, the FET 106 may be controlled by the load controller 305, by inputting a signal from the receiver 108 directly to the gate of the FET 106. In addition, in the present embodiment, the FET 106 is disposed within the battery module 100-1, but, in an alternative, the FET 106 may be disposed either in a portion of the battery pack 200-1 which is located outside of the battery module 100-1, or in the electric device 300-1.

FIG. 2 is a functional block diagram illustrating the battery pack system according to the present embodiment.

Three (3) battery modules 100-1 are interconnected in series, via the terminal 107, to form the battery module group, which is housed within the battery pack 200-1. In addition, the battery module group is electrically connected with a discharge output terminal 201 via which the battery module group can supply electricity to the electric device 300-1.

Three (3) receivers 108 of the three (3) battery modules 100-1 are interconnected in parallel, and are connected with a transmitter 311 of the electric device 300-1 via a receiver 202 of the battery pack 200-1. All of the three (3) battery modules 100-1 can simultaneously receive an enable signal or a disable signal, once disable signal a load controller 305 of the electric device 300-1 has transmitted the enable signal or the disable signal to the battery pack 200-1 through the transmitter 311. As a result, if the load controller 305 of the electric device 300-1 transmits the enable signal or the disable signal to the battery pack 200-1, then all of the three (3) battery modules 100-1 of the battery pack 200-1 modulate their battery module voltages outputted from their terminals 107 simultaneously, from V2 to V1, or from V1 to V2.

In addition, three (3) transmitters 109 of the three (3) battery modules 100-1 are interconnected in series, and are connected with a receiver 310 of the electric device 300-1 through a transmitter 203 of the battery pack 200-1. That is, the load controller 305 of the electric device 300-1 can recognize from the status of the receiver 310, the fact that at least one of the three (3) battery modules 100-1 has transmitted the disable signal to the receiver 310, if any. Upon reception of the disable signal from the battery pack 200-1, the load controller 305 of the electric device 300-1 turns the load device 304 inactive, and transmits the disable signal to the battery pack 200-1. As a result, the battery module voltages of all of the three (3) battery modules 100-1 within the battery pack 200-1 become equal to V2.

The electric device 300-1, which is connected with the battery pack 200-1, houses the load device 304 and the load controller 305 which controls the load device 304 using electricity supplied from the battery pack 200-1. The load device 304 receives electricity from the battery pack 200-1 through a power input terminal 301, via a switch 303 operated by an operator and an FET 302 for load control controlled by the load controller 305.

If the operator turns on the switch 303, then the load controller 305 brings the FET 302 into an electrical conduction state, to thereby electrically connect the battery pack 200-1 with the load device 304. On the other hand, if the operator turns off the switch 303, then the load controller 305 brings the FET 302 into an electrical isolation state, to thereby electrically disconnect the battery pack 200-1 from the load device 304. In addition, the load controller 305 converts a voltage ($\Sigma V1$ or $\Sigma V2$, as described later) inputted from the battery pack 200-1 to a voltage required for keeping the load controller 305 itself active, which is, for example, 5 volts, and receives the resulting voltage.

The load controller 305 is electrically connected with a voltage detector 306, a current detector 307, a switch detector 308, the receiver 310 and the transmitter 311. If at least one of conditions is met, which includes, for example, (a) a condition in which a voltage supplied from and through the discharge output terminal 201 of the battery pack 200-1 falls outside an allowable range, (b) a condition in which the value of a load current flowing through the load device 304 is larger than a predetermined value, (c) a condition in which the value of the load current has been kept lower than a predetermined value for a predetermined length of time, (d) a condition in which a predetermined time has passed after the switch 303 turned off, (e) a condition in which the load controller 305 cannot control the voltage or the current stably at a target value, and (f) a condition in which the receiver 310 receives a disable signal indicating that at least one of the battery modules 100-1 within the battery pack 200-1 is not permitted to output power, then the load controller 305 stops power supply to the load device 304 and transmits from the transmitter 311 to the battery pack 200-1 a disable signal indicating that the load device 304 is not permitted to be activated.

If the load controller 305 of the electric device 300-1 transmits the enable signal, and, if all of the three (3) battery modules 100-1 within the battery pack 200-1 are permitted to output power, then each battery module 100-1 outputs the battery module voltage V1. In this case, a voltage outputted from and through the discharge output terminal 201 of the battery pack 200-1 becomes equal to the sum of the battery module voltages V1 of the battery modules 100-1 interconnected in series, which is denoted as ΣV1. For example, if the battery module voltage V1 is 36 volts, then the ΣV1 becomes equal to 108 volts, and as a result, the electric device 300-1 receives 108 volts from the battery pack 200-1, and operates.

On the other hand, if the load controller 305 of the electric device 300-1 transmits the disable signal, and/or, if at least one of the battery modules 100-1 of the battery pack 200-1 is not permitted to output power, then each battery module 100-1 outputs the battery module voltage V2. In this case, a voltage outputted from and through the discharge output terminal 201 of the battery pack 200-1 becomes equal to the sum of the battery module voltages V2 of the battery modules 100-1 interconnected in series, which is denoted as ΣV2. In an example, if the battery module voltage V2 is 5 volts, then ΣV2 becomes 15 volts. As a result, the electric device 300-1 receives 15 volts from the battery pack 200-1, and the load controller 305 operates using the received voltage of 15 volts. At this time, the voltage is too low to activate the load device 304, and the load device 304 is inactive.

What the load controller 305 of the electric device 300-1 is required to do in an inactive state of the load device 304 is, to enable the switch detector 308 to detect an event that the switch 303 is turned on by the operator, to enable the receiver 310 to detect an event that the battery pack 200-1 is permitted to output power, and to be prepared for enabling the electric device 300-1 to restart immediately after these two events are detected. As a result, the load controller 305, while the load device 304 is inactive, requires electrical power for maintaining itself active.

In a battery pack system disclosed in Japanese Patent No. 4216898, each of a plurality of battery modules in a serial array is inhibited to output power, while a load device of an electric device is inactive, in order to prevent impression of a high voltage onto every segment within a battery pack. In this case, because the battery modules are not electrically interconnected or conducted in series, the load controller of the electric device cannot receive electricity from the battery pack, and therefore, the electric device is required to include therein an electricity storage device which can store electrical power supplied from the battery pack.

In the present embodiment, while the load device 304 of the electric device 300-1 is inactive, each battery module 100-1 outputs a battery module voltage of V2, and the battery pack having the battery modules 100-1 in a serial array outputs a voltage of ΣV2. This reduces a maximum possible voltage impressed onto every segment within the battery pack 200-1, to ΣV2, and allows the load controller 305 to receive the voltage ΣV2 from the battery pack 200-1 so as to be kept active, while ensuring the electrical-insulation reliability of the battery pack 200-1. As a result, this makes it unnecessary to dispose a backup power supply having an electricity storage device which is required for a conventional battery pack.

The battery module voltage V2 is preferably selected, so that ΣV2 can fall within a range between an upper voltage and a lower voltage, wherein the upper voltage is 42V at which the electrical-insulation reliability of the battery pack 200-1 can be easily ensured, and the lower voltage is a minimum voltage over which the load controller 305 can be kept active even when the load device 304 is inactive.

It is added that each battery module 100-1 may have the battery module voltage V2 which is the same as, or different from that of any one of the other battery modules 100-1. For example, if the FETs 106 of all of the battery modules 100-1 are controlled, for allowing each battery module 100-1 to generate the battery module voltage V2, at the respective switching duty ratios or cycles which are shared between the FETs 106, then each battery module 100-1 outputs the battery module voltage V2 having a level depending on the total voltage of the serially-arrayed battery cells in the battery cell group of each battery module 100-1. That is, V2 varies between the battery modules 100-1, and, each time the battery module voltage of each battery module 100-1 alternately changes between V1 and V2, the value of V2 varies as the remaining charge in the battery cell group decreases.

Then, with reference to a flowchart illustrated in FIG. 3, the sequence of discharge control of the battery pack system according to the present embodiment will be described in more detail.

At first, at step S101, the load controller 305 of the electric device 300-1 waits for the operator to turn on the switch 303, with the electric device 300-1 electrically connected with the battery pack 200-1. If the switch 303 is turned ON, then the process proceeds to step S102, and if not so, the waiting mode continues. At step S102, the load controller 305 of the electric device 300-1 transmits to the battery pack 200-1 an enable signal indicating that the load device 304 is permitted to run. Next, at step S103, each battery module 100-1 of the battery pack 200-1 receives the enable signal described above.

At step S104, on a per-battery-module basis, the module controller 110-1 detects the voltage and the temperature of at least one of the battery cells 101 of the battery cell group within each battery module 100-1. Next, at step S105, on a per-battery-module basis, the module controller 110-1 determines if the voltage or the temperature of at least one of the battery cells 101 of the battery cell group, falls outside an allowable range pre-selected not to adversely affect the cycle life or the safety of the battery cells 101, that is, if the voltage or the temperature is in a state that does not permit the discharge. If so, then the module controller 110-1 determines that the discharge is inhibited (the branch is "No"). Thereafter, the module controller 110-1 performs processing for terminating the control. If not so, then the module controller 110-1 determines that the discharge is permitted (the branch is "Yes"). Thereafter, the process proceeds to step S106.

At step S106, each of ones of the module controllers 110-1 which have determined that the discharge is permitted, turns on the corresponding FET 106, with the above-described duty ratio set to, for example, 100%. As a result, the battery module voltage outputted from the corresponding battery module 100-1 is equal to V1.

Next, at step S107, the current module controller 110-1 transmits to the load controller 305 of the electric device 300-1 an enable signal indicating that the corresponding battery modules 100-1 are permitted to output power. If all of the battery modules 100-1 within the battery pack 200-1 are permitted to output power, then, at step S108, the battery pack 200-1 outputs ΣV1 to the electric device 300-1.

Thereafter, at step S109, the load controller 305 receives the enable signal transmitted from the module controller 100-1 at step S107, and the process subsequently proceeds to step S110. At this step S110, the load controller 305 determines that it can receive power from the battery pack 200-1, and begins running the load device 304.

It is added that, as illustrated in FIG. 2, because the transmitters 109 of the battery modules 100-1 within the battery pack 200-1 are interconnected in series, it is necessary for all of the battery modules 100-1 to transmit the enable signal, in order for the load controller 305 to recognize the presence of the enable signal.

Thereafter, at step S111, the load controller 305 detects the voltage and the current of the battery pack 200-1, and the position of the switch 303 of the battery pack 200-1. Subsequently, at step S112, the load controller 305 determines if the detected voltage or current falls within a predetermined range for allowing the electric device 200-1 to be active. If so, then the process proceeds to step S113, and if not so, the process proceeds to step S115. At step S113, the load controller 305 determines whether the switch 303 has been turned off, and, if so, then the process proceeds to step S115, and if not so, the process proceeds to step S114.

It is added that, in an alternative, after a predetermined length of time, such as 0.1 seconds at a minimum, or the length of one day at a maximum, has passed since it was determined, in the step S113, that the switch 303 was turned off, the process may proceed to step S115.

At step S114, the load controller 305 determines if it has received at step S122 described below, the disable signal transmitted from the module controller 110-1 of at least one of the battery modules 100-1 of the battery module group. If so, then the process proceeds to step S115, and if not so, the process returns to step S108 to maintain the load device 304 active.

At step S115, the load controller 305 stops the load device 304. Subsequently, at step S116, the load controller 305 transmits to the module controllers 110-1 of all of the battery modules 100-1, a disable signal indicating that power supply to the load device 304 is inhibited. The disable signal is processed at step S120 described below.

Upon completion of the above-described step S108, the process proceeds to step S118, and also to step S109 for parallel execution. At step S118, each of the module controllers 110-1 of all of the battery modules 100-1 detects the voltage, the temperature and the current, of at least one of the battery cells 101 of the battery cell group housed within a corresponding one of the battery modules 100-1. Thereafter, at step S119, each module controller 110-1 determines if the voltage, the temperature or the current, of at least one of the battery cells 101 of the battery cell group, falls outside a range pre-selected not to adversely affect the cycle life or the safety of the battery cells 101, that is, if the voltage, the temperature or the current is in a state that does not permit the discharge. If so (the branch is "No"), then the process proceeds to step S121, and if not so (the branch is "Yes"), the process proceeds to step S120.

At the step S120, the corresponding module controller 110-1 determines if it has received from the load controller 305, a disable signal indicating that power supply to the load device 304 is inhibited. If so, then the process proceeds to step S121, and if not so, then the process returns to step S108 to keep the load device 304 running.

It is added that, as illustrated in FIG. 2, because the receivers 108 of the battery modules 100-1 within the battery pack 200-1 are interconnected in parallel, if, at step S116, the load controller 305 transmits the disable signals, then all of the battery modules 100-1, after simultaneous reception of the disable signals, each implement step S121.

At step S121, each module controller 110-1 shifts the operation state of the FET 106 from a continuous ON state in which the FET 106 is held in an ON state, to a switching state in which the FET 106 alternately experiences an ON state and an OFF state. That is, the battery module voltage of the battery module 100-1 is modulated from V1 to V2. In this stage, the load controller 305 may execute step S111 and step S112 in the description order, and, upon detection of a drop of the output voltage of the battery pack 200-1 constructed with a group of a serially-interconnected battery modules to below a predetermined value (e.g., an operational voltage at startup), the load controller 305 may perform processing for stopping the load device 304.

Thereafter, at step S122, each module controller 110-1 transmit to the load controller 305 of the electric device 300-1 a disable signal indicating that power output of the battery modules 100-1 is inhibited, and the process proceeds to step S117. The disable signal is processed at step S114.

At step S117, because the previous execution of step S121 results in modulation of the battery module voltage of each battery module 100-1 from V1 to V2, the output voltage of the battery pack 200-1 is modulated from ΣV1 to ΣV2. For the electric device 300-1, because of reception of a voltage of ΣV2 from the battery pack 200-1, the load device 304 becomes inactive, while the load controller 305 is kept active, and, as the processes in step S101-S110 show, the load controller 305 waits until it detects a condition in which there is the need for restarting the load device 304.

Figure 3:
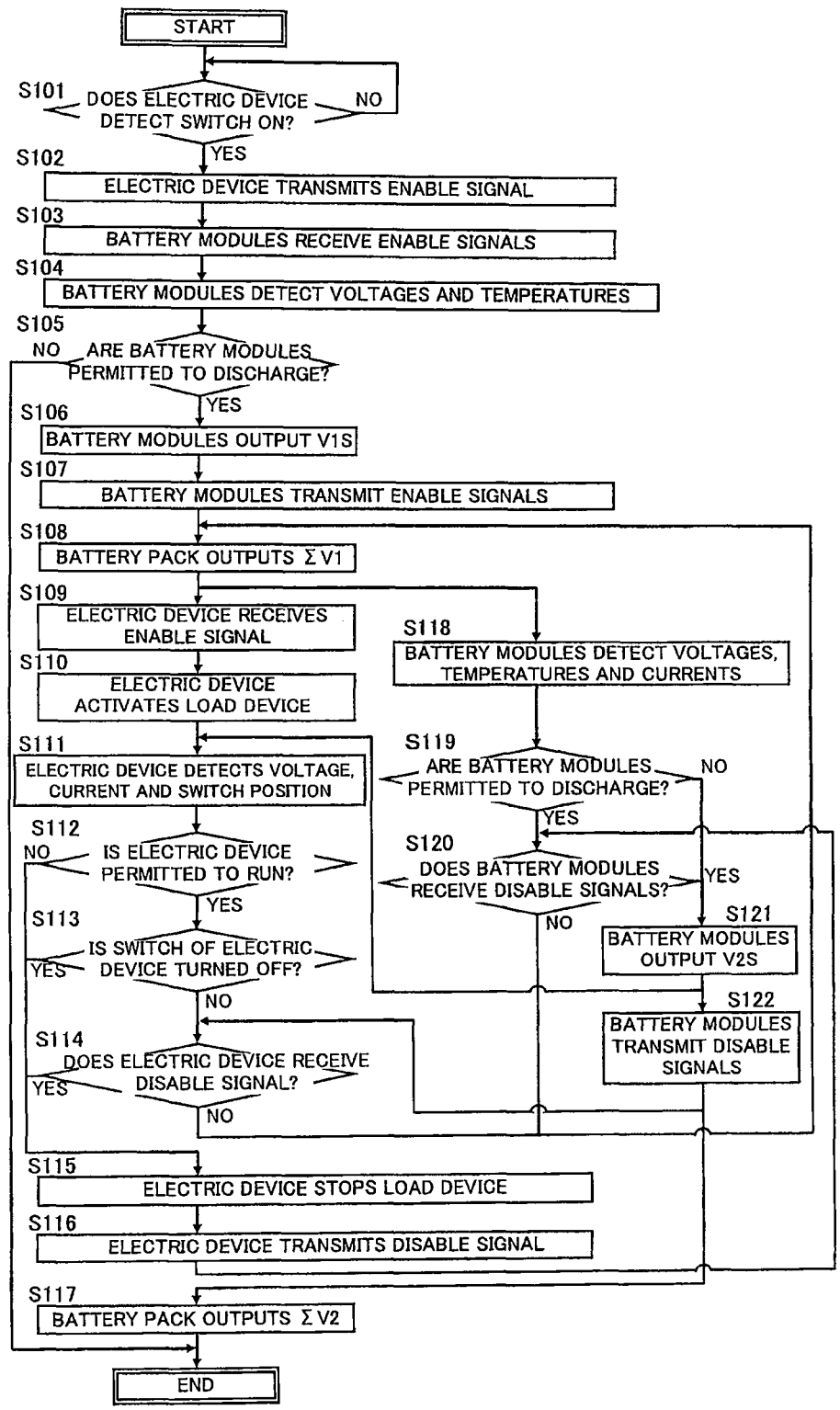
FIG. 3 is a flowchart conceptually illustrating the sequence of discharge control of the battery pack system depicted in FIG. 2.

In the present embodiment, the FET 106 constitutes an example of the "switching device" set forth in the above mode (2), and a portion of each module controller 110-2 which implements step S106 and step S121 in FIG. 3, constitutes an example of the "switching-control circuitry" set forth in the same mode.

As will be evident from the foregoing explanation, in the battery pack system according to the present embodiment, during an active state of the load device 304 of the electric device 300-1, as step S108 shows, the battery module voltage of each battery module 100-1 is equal to V1, and the resulting output voltage of the battery pack 200-1 is equal to ΣV1. On the other hand, in an inactive state of the load device 304, as step S117 shows, the battery module voltage of each battery module 100-1 is equal to V2 lower than V1, and the resulting output voltage of the battery pack 200-1 is equal to ΣV2 far lower than ΣV1. In addition, irrespective of whether the load device 304 is active or not, the battery pack 200-1 supplies electricity featured by ΣV1 or ΣV2 to the load controller 305.

This configuration minimizes how often a maximum voltage impressed onto inter segments within the battery pack system becomes equal to ΣV1, and, on the other hand, while the electric device 300-1 is not used, this configuration reduces the maximum voltage impressed onto the inner segments within the battery pack system, to ΣV2. Therefore, this configuration can keep the load controller 305 active, without using a backup power supply having an electricity storage device, while improving the electrical-insulation reliability (e.g., an ability of protecting a human body from suffering electric shock despite of intrusion of rainwater into the battery pack 200-1), and this configuration further provides an additional effect of ensuring the load controller 305 to successfully restart even after a long-term inactive stop phase of the electric device 300-1, in addition to a cost reduction effect.

In the present embodiment, if the electric device 300-1 turns inactive due to the circumstance on the side of the electric device 300-1, then all of the battery modules 100-1 simultaneously receive disable signals from the electric device 300-1, resulting in a simultaneous reduction of the output voltages of all of the battery modules 100-1 from V1 to V2. On the other hand, during an active state of the electric device 300-1, if the voltage, the current or the temperature of at least one of the battery modules 100-1 has become abnormal in level, then the output voltage of the at least one battery module 100-1 is reduced from V1 to V2, while the output voltages of the remaining battery modules 100-1 each experience a transition phase in which each output voltage is kept constant. In the present embodiment, however, each battery module 100-1, if has experienced a voltage drop, transmits the disable signal to the electric device 300-1, and as a result, the electric device 300-1, in turn, irrespective of its own status, transmits the disable signals to all of the battery modules 100-1. Consequently, for all of the battery modules 100-1, each output voltage eventually reduces from V1 to V2. Therefore, the present embodiment would prevent any one of the battery modules 100-1 from continuously outputting V1 after the concurrent output-voltage reduction, to thereby lose the electrical-insulation reliability.

Next, there will be described a battery pack system which is constructed according to a second illustrative embodiment of the present invention. Elements common to the first embodiment will be referenced the same reference numerals or names as those in the description and illustration of the first embodiment, without redundant description or illustration.

Figure 5:
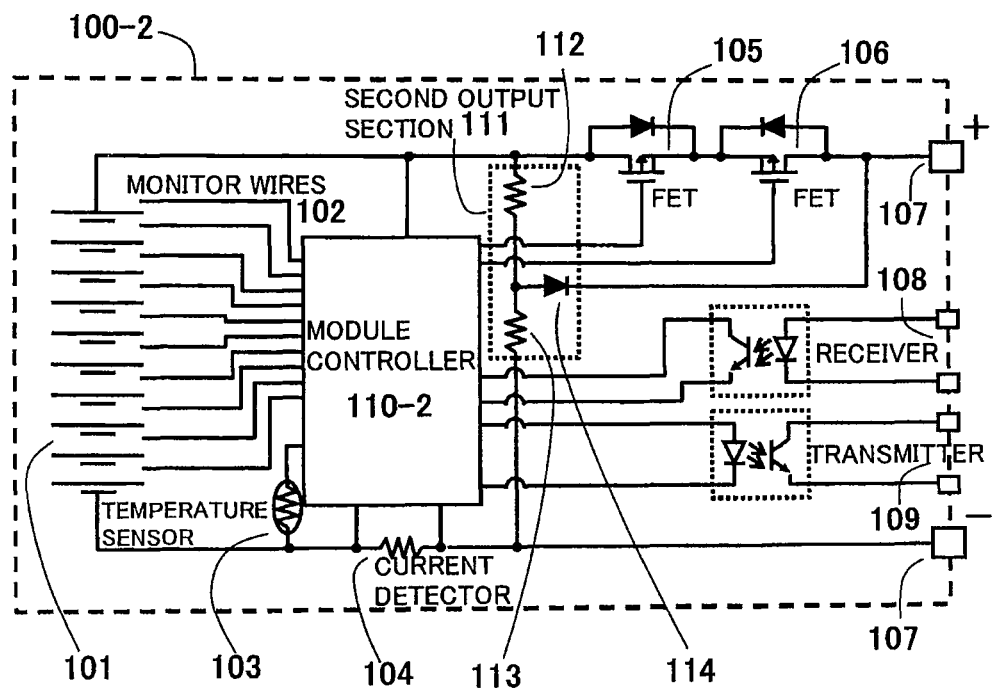
FIG. 5 is a functional block diagram illustrating a representative one of a plurality of battery modules interconnected in series, in a battery pack system according to a second illustrative embodiment of the present invention.

FIG. 5 is a functional block diagram illustrating a representative one of serially-arrayed battery modules 100-2 in a battery pack 200-2 (see FIG. 6) of the battery pack system according to the present embodiment.

The battery module 100-2 according to the present embodiment is similar in the underlying configuration with the battery module 100-1 of the battery pack system according to the first embodiment, except for a second output section 111 which is added to the same as the battery module 100-1 according to the first embodiment. The second output section 111 is constructed with resistances 112, 113 and a diode 114. Notably, the second output section 111 may be preferably connected with the circuit of the battery module 100-2, so that a voltage of the battery cell group of the battery cells 101 can be inputted into the second output section 111 from between the battery cell group and the FET 106.

Figure 6:
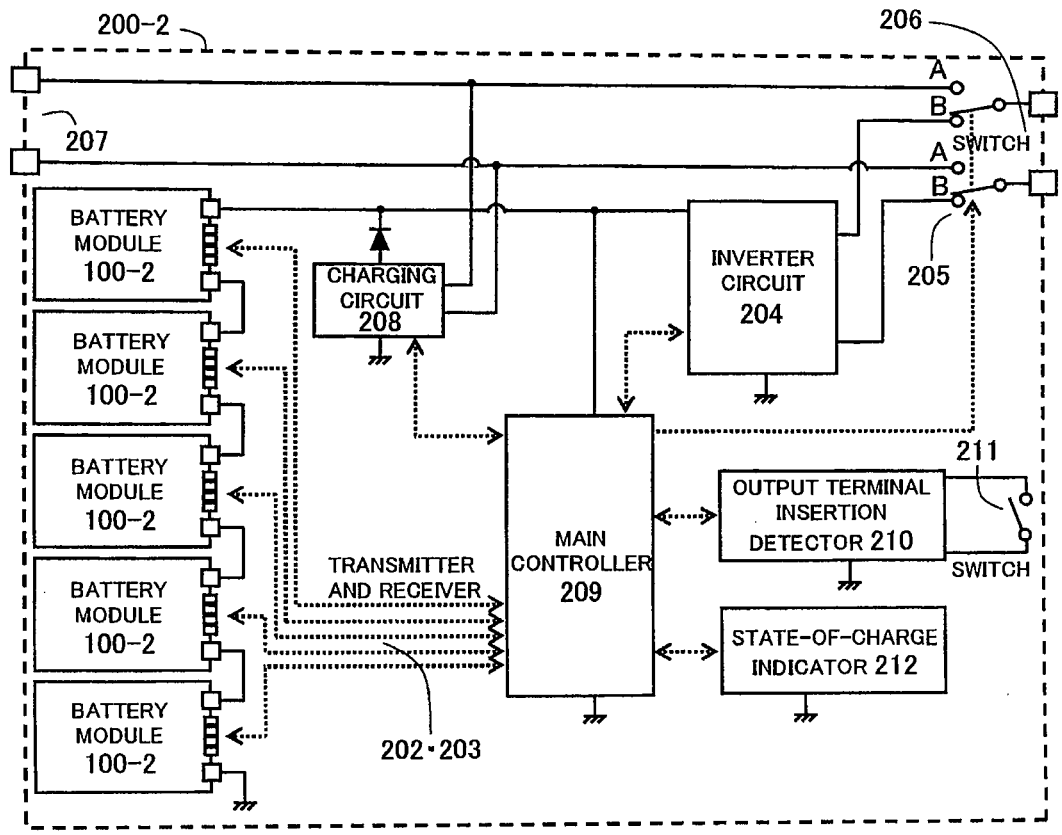
FIG. 6 is a functional block diagram illustrating the battery pack including the battery modules each which is depicted in FIG. 5.

As illustrated in FIG. 5, a module controller 110-2 of the battery module 100-2 modulates the battery module voltage outputted from the terminal 107 of a battery pack 200-2 to a selected one of V1 and V2, based on a detection result from at least one of the voltage detector 102, the temperature detector 103 and the current detector 104, and/or, based on a signal received by the receiver 108 from a main controller 209 (see FIG. 6).

The battery module voltage V1 is generated, after turning on the FET 106, by outputting the total voltage of the battery cell group through the terminal 107. On the other hand, the battery module voltage V2 is generated, after turning off the FET 106, by dividing the total voltage of the battery cell group using the resistances 112 and 113, to produce a fractional voltage of the total voltage, and by outputting the fractional voltage from the terminal 107 through the diode 114. In the present embodiment, the resistances 112, 113 and the diode 114 together constitute an example of the "voltage divider" set forth in the above mode (3).

In an exemplary implementation, if at least one of the voltage of at least one of the battery cell 101 in the battery cell group, the temperature of at least one of the battery cell 101 in the battery cell group, and the current of the battery cell group, falls outside a predetermined allowable range that is pre-selected to permit an inverter circuit 204 (see FIG. 6) to operate, and/or, if the module controller 110-2 has received from the receiver 108, a disable signal indicating that the inverter circuit 204 is inhibited to operate, then the battery module voltage is made equal to V2, and if not so, the battery module voltage is made equal to V1.

The module controller 110-2, when modulating the battery module voltage from V1 to V2, transmits from the transmitter 109 a disable signal indicating that the battery module 100-2 is not permitted to output the battery module voltage V1. On the other hand, if the battery module voltage V1 is permitted to occur, then the module controller 110-2 transmits an enable signal indicating the permission from the transmitter 109.

The battery module voltage V1 is a voltage required to operate the inverter circuit 204 and the main controller 209, which is approximately equal to the total voltage of the battery cell group in which the battery cells are interconnected in series within the battery module 100-2. In addition, values of the resistances 112 and 113 are preferably selected such that the battery module voltage V2 is lower than V1, and is equal to a minimum voltage over which the main controller 209 can be active, and at which the inverter circuit 204 cannot be active, or can be active but cannot output power large enough to allow the electric device to operate and substantially achieve its intended purpose.

In an exemplary implementation, it may be preferable that the battery module voltage V1 is produced by turning on the FET 106, so that V1 can be approximately 36 volts which is equal to the total voltage of the battery cell group, while the battery module voltage V2 is produced by turning off the FET 106 and by dividing the total voltage of the battery cell group to produce a fractional voltage, so that V2 can be approximately 5 volts. In an alternative, both of the battery module voltages V1 and V2 may be preferably produced by duty cycle control for the FET 106, so that V1 and V2 can be two different voltages which are optimum for the battery pack system. For how to modulate the battery module voltage between V1 and V2, any one of a variety of different manners may be preferably selected, which include (a) changing the battery module voltage between V1 and V2 instantaneously, (b) changing the battery module voltage in steps, among V1, V2 and at least one intermediate voltage, (c) changing the battery module voltage between V1 and V2 substantially gradually and continuously, and the like. Notably, gradually changing the battery module voltage from V1 to V2 and/or from V2 to V1 would provide an additional effect of suppressing surge voltage caused by the reactance of the relevant circuit, to thereby reduce burden on components in the circuit.

In an example, the module controller 110-2 may be configured to further include therein a device for blocking a current to be consumed by the second output section 111, in a case in which, while the battery module voltage V2 is being generated, the voltage of at least one of the battery cells 101, which has been detected by the voltage detector 102, has reduced to a voltage lower than a predetermined value, or in a case in which a predetermined time having a length, for example, equal to or longer than the length of one day, has passed after the output of the battery module voltage V2 began, to thereby prevent overcharge of the battery cells 101.

It is added that, in the present embodiment, the FET 106 is controlled by the module controller 110-2, but in an alternative, the FET 106 may be controlled by the main controller 209, by inputting a signal from the receiver 108 directly to the gate of the FET 106. In addition, in the present embodiment, the FET 106 and the second output section 111 are disposed within the battery module 100-2, but, in an alternative, the FET 106 and the second output section 111 may be disposed either in a portion of the battery pack 200-2 which is located outside the battery module 100-2.

FIG. 6 is a function block diagram illustrating the battery pack system according to the present embodiment.

As illustrated in FIG. 6, in the present embodiment, five (5) battery modules 100-2 are serially interconnected via the terminals 107 of the battery modules 100-2, forming a battery module group, which is housed within the battery pack 200-2. The battery module group is electrically connected with an inverter circuit 204. The inverter circuit 204 converts an output voltage of the battery module group into an output voltage having a level which is comparable to that of the commercial power source, which enables power supply to an electric device (not shown) which is electrically connected with an output terminal 206. The main controller 209 converts a voltage inputted from the battery module group ($\Sigma V1$ or $\Sigma V2$) into a voltage, for example, 5 volts, which is required to continuously keep the main controller 209 providing its own function in order for the main controller 209 to receive the resulting voltage.

Moreover, the battery pack 200-2 includes therein a charging circuit 208 configured to receive a voltage of the commercial power source from an input terminal 207, and convert the voltage into a DC voltage, which allows the battery cells of the battery module 100-2 to be charged. The battery pack 200-2 further includes therein a switch 205 which operates such that, if the voltage of the commercial power source is supplied into the input terminal 207, then the switch 205 connects an A side to the output terminal 206, which allows the voltage of the commercial power source to be directly supplied to the electric device which is electrically connected with the output terminal 206, but, if the voltage of the commercial power source is not supplied to the input terminal 207, then the switch 205 connects a B side to the output terminal 206, which allows the voltage outputted from the inverter circuit 204, to be supplied to the electric device which is electrically connected with the output terminal 206.

Five (5) receivers 108 of the five (5) battery modules 100-2 are electrically connected with the main controller 209 via respective receivers 202 and respective transmitters 203. It is added that the receivers 202 and the transmitters 203 can use any one of possible wirings, as long as it allows bi-directional communication between the main controller 209 and the module controllers 110-2 of the battery modules 100-2. This allows the main controller 209 to send an instruction to the each battery module 100-2, and also allows each battery module 100-2 to send an instruction to the main controller 209, wherein the instruction is for modulation of the battery module voltage from V2 to V1, or from V1 to V2. In the present embodiment, the main controller 209 constitutes an example of the above-described "discharge controller" (i.e., a type of a discharge controller in common to the battery modules 100-2), while the module controller 110-2 within each battery module 100-2 constitutes another example of the "discharge controller" (i.e., a type of a discharge controller disposed on a per-battery-module basis).

With the main controller 209, a state-of-charge indicator 212 and an output-terminal insertion detector 210 are electrically connected. The output-terminal insertion indicator 210 includes therein a switch 211 for mechanically detecting a connecting action of a terminal of the electric device to the output terminal 206, and for converting the detection result into an electric signal. It is added that, for how the output-terminal insertion detector 210 detects the connecting action is not limited to the above-mentioned method, but it may alternatively employ a method of electrically detecting the connecting action, or a method of movement of a terminal cover (not shown) which is disposed at the output terminal 206 so that it moves between an open position and a closed position relative to the output terminal 206, to thereby indirectly detect the connecting action.

The main controller 209 operates such that, if at least one of conditions is met, which includes, for example, (a) a condition in which the terminal of the electric device has not been connected with the output terminal 206, (b) a condition in which a predetermined length of time has passed since the inverter circuit 204 entered a non-load state, (c) a condition in which the inverter circuit 204 cannot control the voltage or the current stably at a target value, and (d) a condition in which the receiver 202 receives a disable signal indicating that at least one of the battery modules 100-2 within the battery pack 200-2 is not permitted to output power, then the main controller 209, after stopping the inverter circuit 204 to perform output control, transmits from the transmitter 203 to the five (5) battery modules 100-2 a disable signal indicating that the inverter circuit 204 is not permitted to operate.

If the main controller 209 transmits the enable signal from the transmitter 203, and, if all of the five (5) battery modules 100-2 are permitted to output power, then each battery module 100-2 outputs the battery module voltage V1. In this case, a voltage inputted into the inverter circuit 204 becomes equal to the sum of the battery module voltages V1 of the battery modules 100-2 interconnected in series, which is denoted as $\Sigma V1$. For example, if the battery module voltage V1 is 36 volts, then the $\Sigma V1$ becomes equal to 180 volts, and as a result, the inverter circuit 204 receives a direct current voltage of 180 volts from the battery module group, converts it into an alternate current voltage of 100 volts, and outputs it.

On the other hand, if the main controller 209 transmits the disable signal from the transmitter 203, and/or, if at least one of the five (5) battery modules 100-2 is not permitted to output power, then each battery module 100-2 outputs the battery module voltage V2. In this case, a voltage inputted into the inverter circuit 204 becomes equal to the sum of the battery module voltages V2 of the five battery modules 100-2 interconnected in series, which is denoted as $\Sigma V2$. In an example, if the battery module voltage V2 is 5 volts, then $\Sigma V2$ becomes 25 volts. As a result, the main controller 209 receives 25 volts from the battery module group, and the main controller 209 operates using the received voltage of 25 volts. At this time, the voltage is too low to be converted into an alternate current voltage of 100 volts, the inverter circuit 204 is inactive.

What the main controller 209 is required to do in an inactive state of the inverter circuit 204 is, to enable the output-terminal insertion detector 210 to detect a first event that the terminal of the electric device is connected to the output terminal 206, to enable the receiver 202 to detect a second event that all of the five (5) battery modules 100-2 are permitted to output power, and to be prepared for enabling the inverter circuit 204 to restart in response to concurrent detection of the first and second events. What the main controller 209 is further required is to activate the state-of-charge indicator 212, if needed. As a result, the main controller 209, while the inverter circuit 204 is inactive, requires electrical power for maintaining itself active.

In a battery pack system disclosed in Japanese Patent No. 4104648, each of a plurality of battery modules in a serial array is inhibited to output power, while a discharge controller of a battery pack is inactive, in order to prevent impression of a high voltage onto every segment within the battery pack. In this case, because the battery modules are not electrically interconnected or conducted in series, the discharge controller cannot receive electricity from a group of the battery modules, and therefore, the battery pack is required to include therein an electricity storage device which can store electrical power supplied from the battery module group.

In the present embodiment, while the inverter circuit 204 is inactive, each battery module 100-2 outputs a battery module voltage of V2, and a group of the battery modules 100-2 in a serial array outputs a voltage of $\Sigma V2$. This reduces a maximum possible voltage impressed onto every segment within the battery pack 200-2, to $\Sigma V2$, and allows the main controller 209 to receive the voltage $\Sigma V2$ from the battery module group so as to be kept active, while ensuring the electrical-insulation reliability of the battery pack 200-2. As a result, this makes it unnecessary to dispose a backup power supply having an electricity storage device which is required for a conventional battery pack.

When all of the battery modules 100-2, which are interconnected in series, together forming the battery cell group, output the battery module voltages V2, which are supplied to the main controller 209, a current flowing from the battery cell group of each battery module 100-2 is divided into a fractional current flowing through the resistance 113 and a fractional current flowing through the diode 114.

A current flowing through the diode 114 of each battery module 100-2 is equal to that of the diode 114 of any other battery module 100-2, and is approximately equal to a current consumed by the main controller 209. On the other hand, a current flowing through the resistance 113 of each battery module 100-2 depends on the voltage of the battery cell group within each battery module 100-2. If the voltage of the battery cell group within one of the battery modules 100-2 is higher than that of the battery cell group within any other battery module 100-2, then the current flowing through the resistance 113 of the one battery module 100-2 is larger than a current flowing through the resistance 113 of any other battery module 100-2.

In general, a voltage difference between the battery cell groups of the battery modules 110-2 becomes larger, as the battery modules 100-2 is used longer, due to the differences in the various properties between the battery cells 101-2. The present embodiment, however, would provide of an additional effect of autonomously eliminating the above-described voltage difference, that is, a capacity imbalance between the battery modules 100-2, with improved system reliability of the battery pack system.

The battery module voltage V2 is preferably selected, so that $\Sigma V2$ can fall within a range between an upper voltage and a lower voltage, wherein the upper voltage is 42V at which the electrical-insulation reliability of the battery pack 200-2 can be easily ensured, and the lower voltage is a minimum voltage over which the main controller 209 can be kept active even when the inverter circuit 204 is inactive. It is added that, because each battery module 100-2 may have the battery module voltage V2 which depends on the voltage of the battery cell group of each battery module 100-2, V2 varies between the battery modules 100-2, and, each time the battery module voltage of each battery module 100-2 alternately changes between V1 and V2, the value of V2 varies as the remaining charge in the battery cell group decreases.

Figure 7:
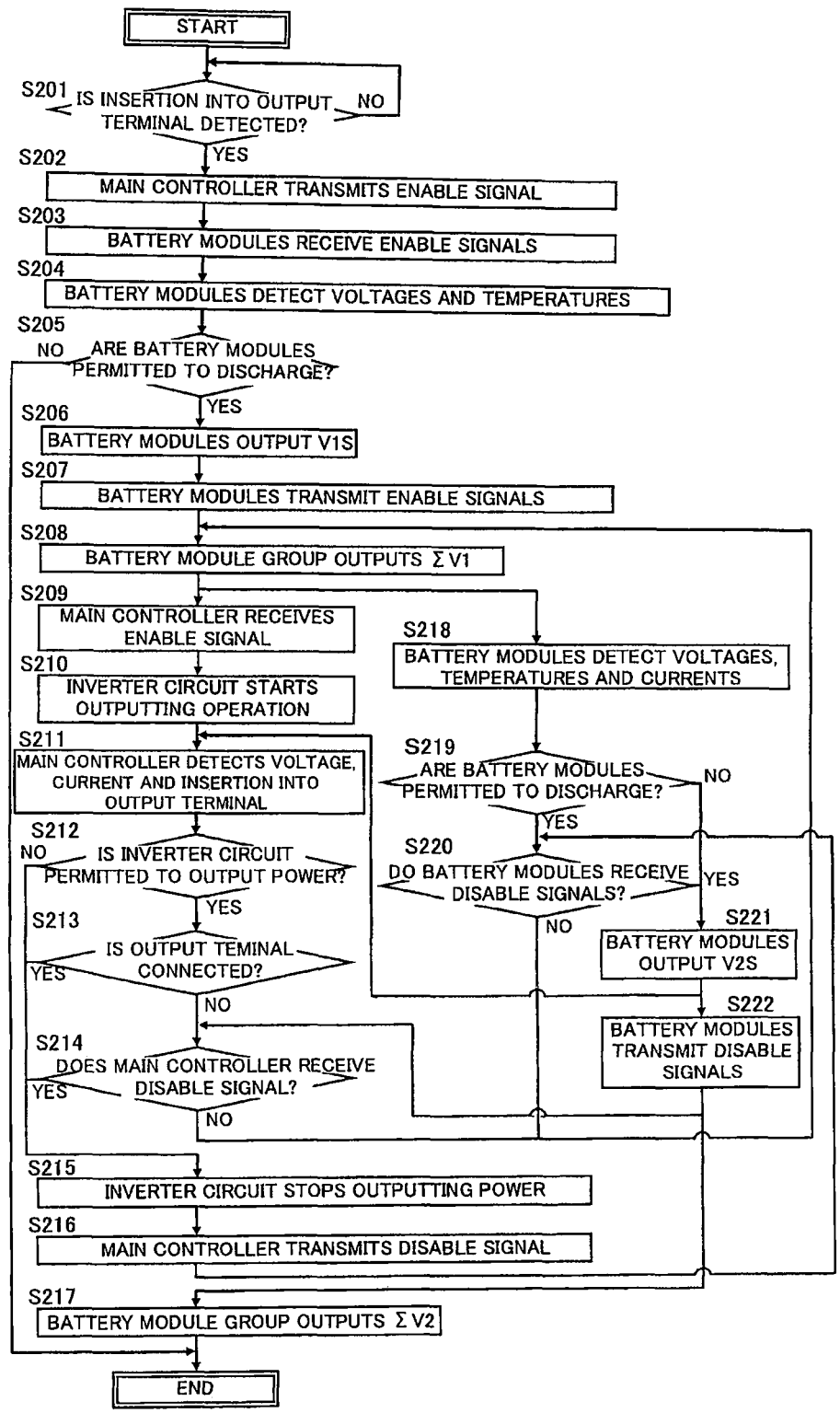
FIG. 7 is a flowchart conceptually illustrating the sequence of discharge control of the battery pack system according to the second embodiment.
Figure 8:
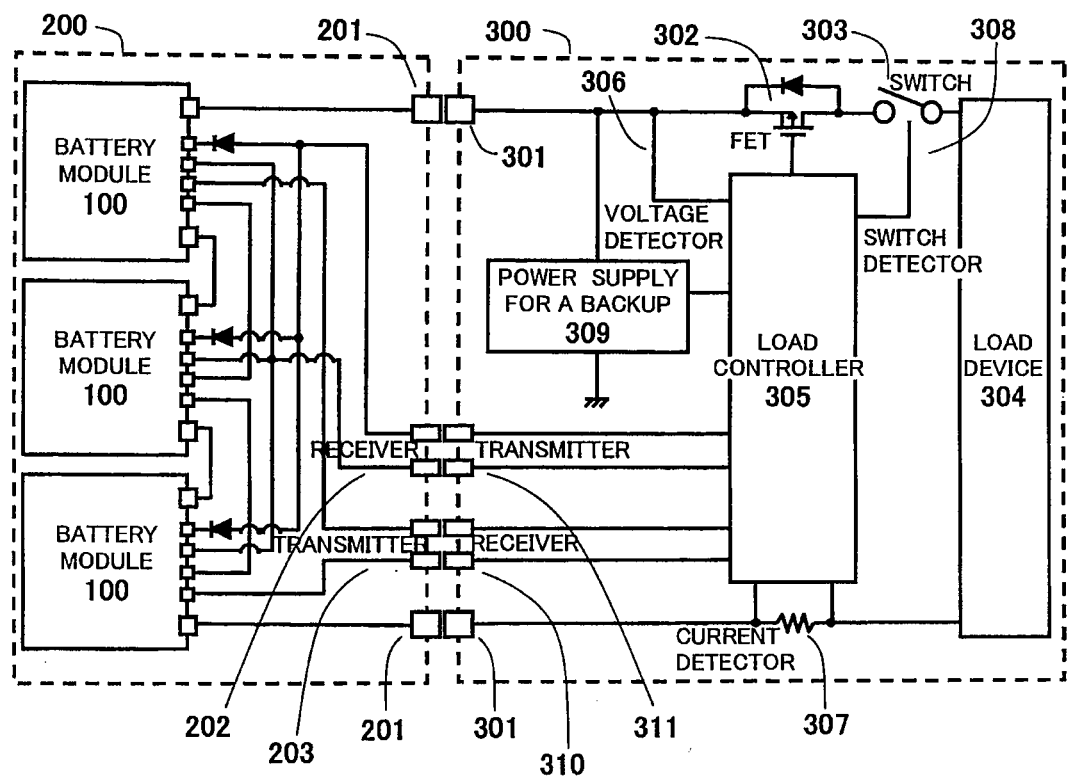
FIG. 8 is a functional block diagram illustrating an example of a conventional battery pack system.

FIG. 7 is a flowchart conceptually illustrating the sequence of the discharge control of the battery pack system according to the present embodiment.

At step S201, the main controller 209 waits for the output-terminal insertion detector 210 to detect a plug-in event that the terminal of the electric device is plugged in the output terminal 206 of the battery pack 200-2. If the plug-in event is detected, then the process proceeds to step S202, and if not so, the main controller 209 further waits. At step S202, the main controller 209 transmits to each battery module 100-2 an enable signal indicating that the inverter circuit 204 is permitted to run. Thereafter, at step S203, each battery module 100-2 receives the enable signal.

Subsequently, at step S204, the module controller 110-2 of each battery module 100-2 detects the voltage and the temperature of at least one of the battery cells 101 of the battery cell group within each battery module 100-2. Thereafter, at step S205, on a per-battery-module basis, the module controller 110-2 determines if the voltage or the temperature of at least one of the battery cells 101 of the battery cell group, falls outside an allowable range pre-selected not to adversely affect the cycle life or the safety of the battery cells 101, that is, if the voltage or the temperature is in a state that does not permit the discharge. If so, then the module controller 110-2 determines that the discharge is inhibited (the branch is "No"). Thereafter, the module controller 110-2 performs processing for terminating the control. If not so, then the module controller 110-2 determines that the discharge is permitted (the branch is "Yes"). Thereafter, the process proceeds to step S206.

At step S206, each of ones of the module controllers 110-2 which have determined that the discharge is permitted, turns on the corresponding FET 106. As a result, the battery module voltage outputted from the corresponding battery module 100-2 is equal to V1. Next, at step S207, the current module controller 110-2 transmits to the main controller 209 an enable signal indicating that the corresponding battery modules 100-2 are permitted to output power. If all of the battery modules 100-2 within the battery pack 200-2 are permitted to output power, then, at step S208, the battery module group of the battery packs 200-2 outputs $\Sigma V1$ to the inverter circuit 204.

Thereafter, at step S209, the main controller 209 receives the enable signal transmitted from the module controller 100-2 at step S207, and the process subsequently proceeds to step S210. At this step S210, the main controller 209 determines that the battery module group can output power to the inverter circuit 204, and begins running the inverter circuit 204. It is added that, for the inverter circuit 204 to run, it is necessary for all the battery modules 100-2 transmit the enable signal.

Thereafter, at step S211, the main controller 209 detects the voltage and the current of the battery module group, and an event that the terminal of the electric device has been plugged in the output terminal 206. Subsequently, at step S212, the main controller 209 determines if the detected voltage or current falls within a predetermined range for allowing the inverter circuit 204 to become active. If so, then the process proceeds to step S213, and if not so, the process proceeds to step S215. At step S213, the main controller 209 determines whether the terminal of the electric device has been removed from the output terminal 206, and, if so, then the process proceeds to step S215, and if not so, the process proceeds to step S214.

It is added that, in an alternative, after a predetermined length of time, such as 0.1 seconds at a minimum, or the length of one day at a maximum, has passed since it was determined, in the step S213, that the terminal of the electric device was removed from the output terminal 206, the process may proceed to step S215. In an alternative, if the inverter circuit 204 has been kept in the non-load state for a predetermined length of time, then the process proceeds to step S215.

At step S214, the main controller 209 determines if it has received at step S222 described below, the disable signal transmitted from the module controller 110-2 of at least one of the battery modules 100-2 of the battery module group. If so, then the process proceeds to step S215, and if not so, the process returns to step S208 to maintain the inverter circuit 204 active.

At step S215, the main controller 209 stops the inverter circuit 204. Subsequently, at step S216, the main controller 209 transmits to the module controllers 110-2 of all of the battery modules 100-2, a disable signal indicating that power supply to the inverter circuit 204 is inhibited. The disable signal is processed at step S220 described below.

Upon completion of the above-described step S208, the process proceeds to step S218, and also to step S209 for parallel execution. At step S218, each of the module controllers 110-2 of all of the battery modules 100-2 detects the voltage, the temperature or the current, of at least one of the battery cells 101 of the battery cell group housed within a corresponding one of the battery modules 100-2. Thereafter, at step S219, each module controller 110-2 determines if the voltage, the temperature or the current, of at least one of the battery cells 101 of the battery cell group, falls outside a range pre-selected not to adversely affect the cycle life or the safety of the battery cells 101, that is, if the voltage, the temperature or the current is in a state that does not permit the discharge. If so (the branch is "No"), then the process proceeds to step S221, and if not so (the branch is "Yes"), the process proceeds to step S220.

At the step S220, the corresponding module controller 110-2 determines if it has received from the main controller 209, a disable signal indicating that power supply to the inverter circuit 204 is inhibited. If so, then the process proceeds to step S221, and if not so, then the process returns to step S208 to keep the inverter circuit 204 running. It is added that, if, at step S216, the main controller 209 transmits the disable signals, then all of the battery modules 100-2, after simultaneous reception of the disable signals, each implement step S221.

At step S221, each module controller 110-2 shifts the operation state of the FET 106 from an ON state to an OFF state, thereby modulate the battery module voltage of the battery module 100-2 from V1 to V2 which is produced as a result of the voltage division using the resistances 112 and 113. In this stage, the main controller 209 may execute step S211 and step S212 in the description order, and, upon detection of a drop of the output voltage of the battery module group to below a predetermined value, the main controller 209 may perform processing for stopping the inverter circuit 204.

At step S222, each module controller 110-2 transmit to the main controller 209 a disable signal indicating that power output of the battery modules 100-2 is inhibited, and the process proceeds to step S217. The disable signal is processed at step S214.

At step S217, because the previous execution of step S221 results in modulation of the battery module voltage of each battery module 100-2 from V1 to V2, the output voltage of the battery pack 200-2 is modulated from ΣV1 to ΣV2. Because of reception of a voltage of ΣV2 from the battery module group, the inverter circuit 204 becomes inactive, while the main controller 209 is kept active, and, as the processes in step S201-S210 show, the main controller 209 waits until it detects a condition in which there is the need for restarting the inverter circuit 204.

In the present embodiment, the FET 106 constitutes an example of the "switching device" set forth in the above mode (3), the resistances 112 and 113 and the diode 114 together constitute an example of the "voltage divider" set forth in the same mode, and these components, and a portion of each module controller 110-2 which implements step S206 and step S221 in FIG. 7, together constitute an example of the "output voltage modulator" set forth in the same mode.

As will be evident from the foregoing explanation, in the battery pack system according to the present embodiment, during an active state of the inverter circuit 204, as step S208 shows, the battery module voltage of each battery module 100-2 is equal to V1, and the resulting output voltage of the battery pack 200-2 is equal to ΣV1. On the other hand, in an inactive state of the inverter circuit 204, as step S217 shows, the battery module voltage of each battery module 100-2 is equal to V2 lower than V1, and the resulting output voltage of the battery pack 200-2 is equal to ΣV2 far lower than ΣV1. In addition, irrespective of whether the inverter circuit 204 is active or not, the battery module group supplies electricity featured by ΣV1 or ΣV2 to the main controller 209.

This configuration minimizes how often a maximum voltage impressed onto inter segments within the battery pack system becomes equal to ΣV1, and, on the other hand, while the electric device is not connected with the output terminal 206, or while the electric device is not used, this configuration reduces the maximum voltage impressed onto the inner segments within the battery pack system, to ΣV2. Therefore, this configuration can keep the main controller 209 active, without using a backup power supply having an electricity storage device, while improving the electrical-insulation reliability (e.g., an ability of protecting a human body from suffering electric shock despite of intrusion of rainwater into the battery pack 200-2), and this configuration further provides an additional effect of ensuring the inverter circuit 204 to successfully restart even after a long-term inactive stop phase of he electric device 3, in addition to a cost reduction effect.

Reference throughout the specification to "one embodiment" or "an embodiment" means that a particular feature, structure, or characteristic described in connection with the embodiment is included in at least one embodiment of the present invention.

Thus, the appearance of the phrases "in one embodiment" or "in an embodiment" in various places throughout the specification are not necessarily all referring to the same embodiment. Furthermore, the particular features, structures, or characteristics may be combined in any suitable manner in one or more embodiments.

Moreover, inventive aspects lie in less than all features of a single disclosed embodiment. Thus, the claims following the Detailed Description are hereby expressly incorporated into this Detailed Description, with each claim standing on its own as a separate embodiment of this invention.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A battery pack usable as a power source of an electric device, comprising:
   a battery module group in which a plurality of battery modules are interconnected in series; and
   a discharge output terminal through which discharge power is supplied from the battery module group to the electric device,
   wherein each battery module is configured to include a battery cell group in which a plurality of battery cells are interconnected in series, the battery pack further comprising:
- a discharge controller configured to control the discharge power which is supplied from the battery module group to the electric device; and
- an output voltage modulator configured to modulate a module output voltage of each battery module between a high voltage and a low voltage which is higher than zero and lower than the high voltage, depending on an instruction signal from the discharge controller, the output voltage modulator is configured to include:
  - a switching device which is connected with a current path allowing a current to flow to the battery module group and the discharge output terminal, and which varies between an ON state and an OFF state, in response to a control signal, and
  - switching-control circuitry configured to perform switching control for the switching device, by supplying the control signal with a variable duty ratio, to the switching device, and to control the control signal such that the duty ratio varies between when the module output voltage is equal to the high voltage and when the module output voltage is equal to the low voltage, and wherein:
- the electric device is configured to include a load device,
- the load device operates by the discharge power of the battery module group when each battery module outputs the high voltage, and does not operate by the discharge power of the battery module group when each battery module outputs the low voltage, and
- the discharge controller operates by the battery module group, irrespective of whether each battery module outputs the high voltage or the low voltage.

2. The battery pack according to claim 1, wherein the output voltage modulator is configured to modulate the module output voltage substantially continuously or in steps, as time elapses, during a period in which the module output voltage transitions between the high voltage and the low voltage.

3. A battery pack system having an electric device and a battery pack usable as a power source of the electric device, comprising:
- a battery module group in which a plurality of battery modules are interconnected in series; and
- a discharge output terminal through which discharge power is supplied from the battery module group to the electric device, wherein each battery module is configured to include a battery cell group in which a plurality of battery cells are interconnected in series, the battery pack system further comprising:
- a discharge controller configured to control the discharge power which is supplied from the battery module group to the electric device; and
- an output voltage modulator configured to modulate a module output voltage of each battery module between a high voltage and a low voltage which is higher than zero and lower than the high voltage, depending on an instruction signal from the discharge controller, the output voltage modulator is configured to include:
  - a switching device which is connected with a current path allowing a current to flow to the battery module group and the discharge output terminal, and which varies between an ON state and an OFF state, in response to a control signal, and
  - switching-control circuitry configured to perform switching control for the switching device, by supplying the control signal with a variable duty ratio, to the switching device, and to control the control signal such that the duty ratio varies between when the module output voltage is equal to the high voltage and when the module output voltage is equal to the low voltage, and wherein:
- the high voltage and the low voltage are set to allow a load device of the electric device to operate by the discharge power of the battery module group when each battery module outputs the high voltage, and to allow the load device not to operate by the discharge power of the battery module group when each battery module outputs the low voltage, and
- the discharge controller operates by the battery module group, irrespective of whether each battery module outputs the high voltage or the low voltage.

* * * * *